United States Patent [19]
Rimlinger, Jr.

[11] Patent Number: 5,749,273
[45] Date of Patent: May 12, 1998

[54] METHOD AND APPARATUS FOR ADVANCING A TOOL ON A LATHE

[76] Inventor: Charles H. Rimlinger, Jr., 928 Forest Acres Ct., Nashville, Tenn. 37220

[21] Appl. No.: 546,775

[22] Filed: Oct. 23, 1995

[51] Int. Cl.$^6$ .............................. B23B 21/00; B23Q 5/40
[52] U.S. Cl. .............................. 82/1.11; 82/136; 82/141; 74/89.15; 74/625
[58] Field of Search .............................. 82/112, 136, 137, 82/141, 1.11; 74/89.15, 625; 451/14, 15, 136, 162

[56] References Cited

U.S. PATENT DOCUMENTS

| | | | |
|---|---|---|---|
| 2,257,493 | 9/1941 | Blazek et al. | 29/27 |
| 2,891,435 | 6/1959 | Billeter | 82/2 |
| 4,455,900 | 6/1984 | Callanan et al. | 82/4 A |
| 4,478,116 | 10/1984 | Fuller | 82/4 A |
| 4,773,290 | 9/1988 | Iwata et al. | 82/1.2 |

OTHER PUBLICATIONS

Portion of Operating Manual for AMMCO 2002 Brake Lathe, Including title page, table of contents and pp. B2 B3, B4, D5 & D6, published 1986.

*Primary Examiner*—M. Rachuba
*Assistant Examiner*—Kenneth J. Hansen
*Attorney, Agent, or Firm*—Chambliss, Bahner & Stophel, P.C.

[57] ABSTRACT

A method is disclosed for imparting relative motion between a tool that is carried by a tool holder and a workpiece on a lathe. According to this method, a feed screw is provided, which has a first end and a second end and a threaded portion near the first end. A tool holder carrying a tool is fixed with respect to the second end of the feed screw, so that axial motion of the feed screw will be translated to the tool carried by the tool holder. A hollow drive tube is also provided, which has an internal diameter large enough to accommodate the feed screw and which is disposed to rotate about its long axis. The drive tube is mounted at a location that is fixed with respect to the workpiece, and a nut that is threaded to mate with the threaded portion of the feed screw is attached to one end of the drive tube. Apparatus for rotating the drive tube is attached thereto, and the second end of the feed screw is locked so that rotational motion thereof is inhibited. The nut is mated with the threaded portion of the feed screw, and the drive tube is rotated so as to impart axial motion to the feed screw as the nut rotates thereabout and to impart relative motion thereby to the tool that is carried by the tool holder. An apparatus which operates according to this method is also disclosed.

24 Claims, 4 Drawing Sheets

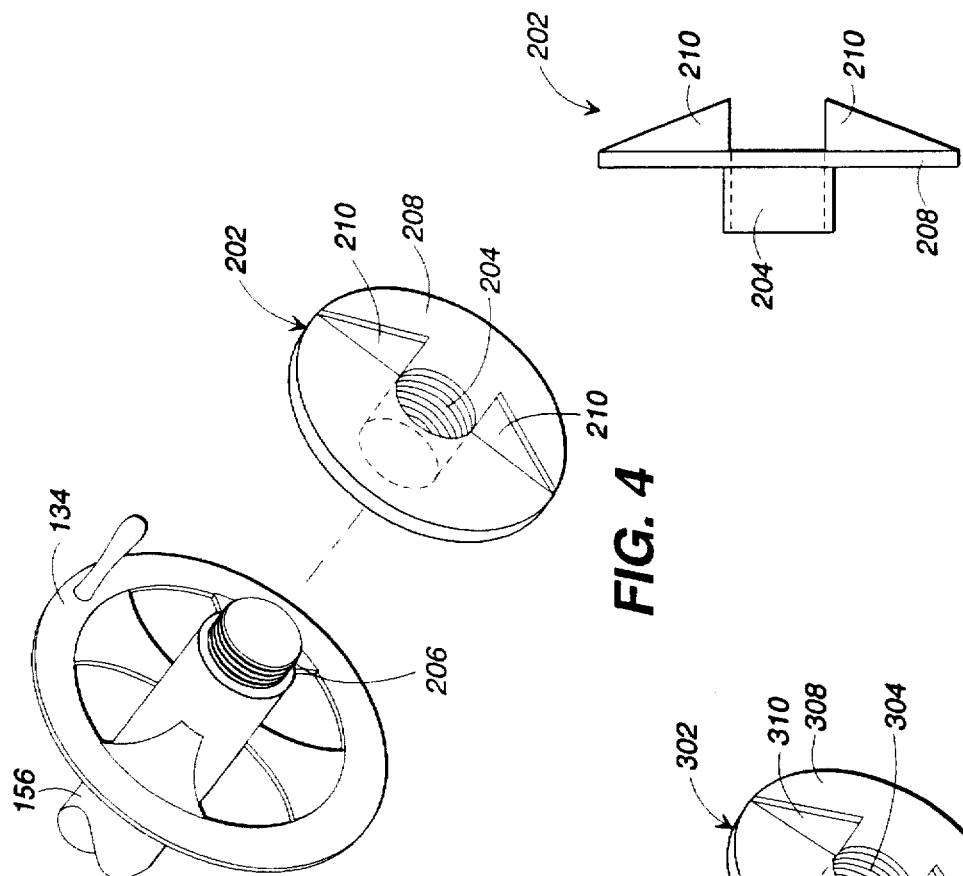
FIG. 4
FIG. 5
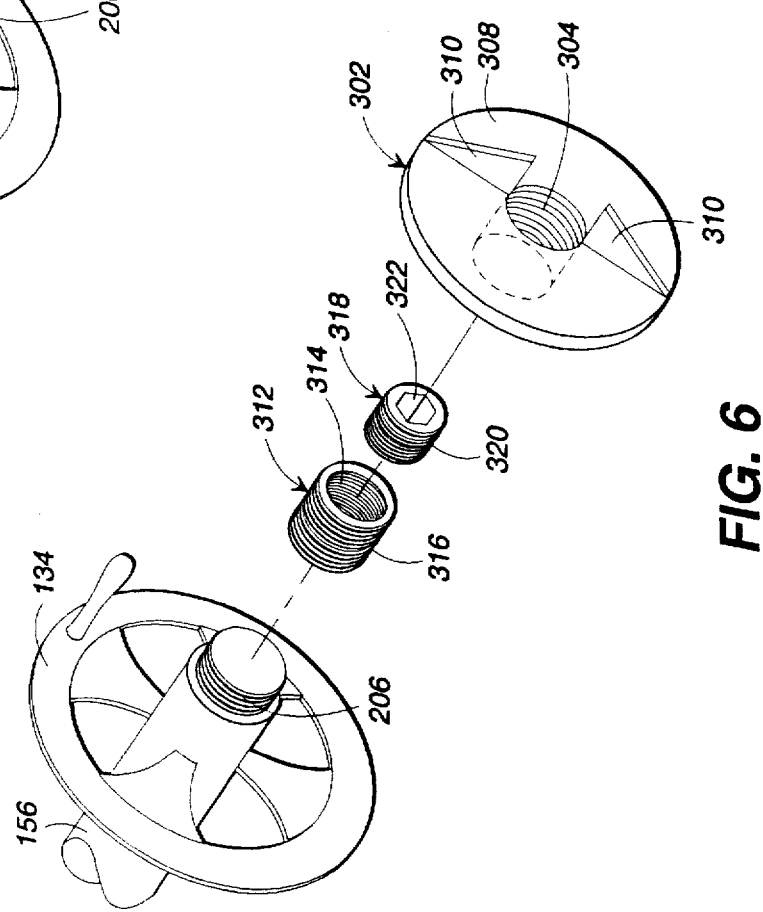
FIG. 6

METHOD AND APPARATUS FOR ADVANCING A TOOL ON A LATHE

FIELD OF THE INVENTION

This invention relates to lathes that are used to machine workpieces, and to a method and apparatus for advancing a tool such as a cutting tool with respect to a workpiece on a lathe. More specifically, the invention relates to brake lathes that are used to machine the friction surfaces of scored, warped and worn disc brake rotors.

BACKGROUND OF THE INVENTION

Generally, an automotive brake is a mechanical device for retarding the motion of the vehicle by means of friction. These brakes use friction between brake surfaces that turn with the wheels and stationary friction pads (with respect to the turning wheels) to convert the kinetic energy of the moving vehicle into heat. There are tremendous forces involved in braking a vehicle, and these forces can result in the generation of considerable heat during braking, as well as the wear of the friction surfaces and pads of the brakes. Wear may be accelerated by, among other things, dirt or dust that may infiltrate the brake assembly and migrate to locations between the pads and the friction surfaces. In addition, because the friction pads in use today are no longer made with asbestos, a superior heat-dissipating material, accelerated wear due to the effects of high heat generation is more common than in the past.

Vehicles are generally equipped with drum-type or disc-type brakes. Most vehicles in use today are provided with disc-type brakes on at least the front wheels, and sometimes on all four wheels. Drum-type brakes were more commonly used in the past than they are today, but they are still utilized on the rear wheels of a significant number of vehicles.

Disc-type brakes operate by forcing friction pads (brake linings) against both sides of a rotating metal disc. This disc, or rotor, turns with the wheel of the vehicle and within a stationary housing called the caliper assembly. When the brakes are applied, hydraulic fluid causes pistons in the caliper assembly to push the friction pads against the rotating disc, thereby retarding the motion of the vehicle.

Drum-type brakes include a metal brake drum which rotates with the wheel. The drum has an internal cylindrical surface against which brake shoes, equipped with friction pads (brake linings), having arcuate external surfaces that correspond to the internal surface of the drum, are pushed by the action of a piston.

Wear, misuse or improper maintenance of brake drums and discs can lead to damage, such as warping or the development of grooves or scoring in the friction surfaces. Such surface damage will reduce the effectiveness of the brakes by reducing the areas of such surfaces that are placed into contact with the friction pads to slow the vehicle. Warping, grooves and scoring in worn brake discs and drums may generally be removed, however, if not too deep or extensive, to restore full function to the brakes. Since discs and drums have a significant value, refacing of the friction surfaces is economically preferably to replacement, if it can be accomplished at a reasonable cost.

A brake disc or drum is generally removed from the vehicle and mounted on a lathe to reface its friction surface. Typically, such a lathe is equipped with a rotating spindle on which the workpiece may be mounted, and a slide assembly on which a cutting or grinding tool may be mounted. As the workpiece is turned on the spindle, the cutting or grinding tool is advanced, either automatically or manually, into engagement with the workpiece to trim or shave metal from the workpiece until the desired dimension and surface finish are obtained.

Early brake lathes were developed to finish the brake drum surfaces that had been scored or unevenly worn. Many of these brake drum lathes operate to refinish the inner cylindrical surface of the drum by advancing a tool in a direction parallel to the axis of the spindle on which the drum is rotated. An example of such a brake lathe is that of U.S. Pat. No. 2,257,493 of Blazek et al. This lathe includes a rotatable spindle upon which a brake drum may be mounted, and a tool carriage mounted on a pair of vertically-spaced slideways that are disposed parallel to the axis of the spindle. The tool carriage is propelled along the slideways in either direction parallel to the axis of the spindle by the turning of a screw, by means of a motor or by means of a hand crank. Mounted on the carriage is a cross-slide to which a cutting or grinding tool is attached, which cross-slide is adapted to be moved inwardly and outwardly (with respect to the spindle) by the turning (by means of another hand crank) of a second screw in order to set the tool with respect to the workpiece to initiate working thereof.

Another type of brake drum lathe is described in U.S. Pat. No. 2,891,435 of Billeter. This lathe operates by advancing the rotating spindle carrying the drum in a direction along its axis while holding the tool in a fixed position of engagement with the inner surface of the drum. The spindle is advanced with respect to the tool by the rotation of a feed screw which is in threaded engagement with the frame of the lathe, and which is disposed parallel to the axis of the spindle. The spindle is rotated by a motor that engages it by means of a worm gear assembly, and a complicated mechanical power-transmission assembly is utilized to move the spindle axially or longitudinally as the spindle is rotated in order to feed the workpiece to a stationary cutting tool. This transmission is a complex mechanical device, which incorporates a plurality of gears, springs and friction disks to transmit rotation to the feed screw upon rotation of the spindle, so that the spindle may be advanced with respect to the stationary tool.

More recently, brake lathes have been developed to restore disc-type brake rotors. Such lathes operate by advancing a tool across one or both sides of the rotor in a direction perpendicular to the axis of the spindle on which the disc is rotated. Some rotor refinishing machines operate in this fashion to refinish a disc that is still attached to the vehicle, and in such cases the spindle on which the rotor is rotated is the axle of the vehicle itself. It is common for such lathes and rotor refinishing machines to advance a tool carriage carrying the working tool by means of the turning of a feed screw in a frame that is fixed with respect to the rotor. Such feed screw advancement mechanisms are frequently quite similar to those used in connection with the brake drum lathes that have been discussed herein. A rotor refinishing machine that operates in this manner is described in U.S. Pat. No. 4,478,116 of Fuller.

Brake lathes have also been developed which are multi-purpose machines that may be operated so as to permit finishing, by suitable adjustment, of both brake drums and rotors. Thus, for example, U.S. Pat. No. 4,455,900 of Callanan et al. describes a lathe having a spindle that can be fixed in either of two positions with respect to the frame of the machine, one for brake drums and the other for rotors. A tool carriage is advanced by the turning of a feed screw to move the tool along the friction surface or surfaces of the workpiece to be worked. In the first position, the spindle is oriented parallel to the feed screw so that tool may be advanced axially with respect to the spindle to machine the friction surface of a brake drum. In the second position, the spindle is oriented perpendicular to the feed screw so that the tool may be advanced radially with respect to the spindle to machine the friction surfaces of a rotor.

In addition, some lathes that were designed to machine brake drums have been modified to permit refinishing of brake discs as well. One such brake drum lathe is described in U.S. Pat. No. 2,891,435 of Billeter, which is described hereinabove.

The Billeter brake drum lathe has been modified to permit machining of brake discs by modifying the tool carriage assembly to incorporate a cross-feed mechanism. The basic tool carriage assembly for the Billeter lathe includes a tubular element that is mounted transverse to the axis of the spindle in such fashion as to be capable of sliding motion in the transverse direction for a distance sufficient to locate a tool mounted on the assembly for engagement with brake drums of a variety of sizes. One end of the tubular element is enclosed by a cap having a threaded hole at the center thereof, which cap is fixed on the frame of the lathe and is of such dimension that the tubular element may slide through its range of motion without coming into contact with the cap. The other end of the tubular element is provided with a bore that is adapted to support an adjusting shaft and to permit rotation of the shaft therein. The adjusting shaft is threaded on one end to mate with the hole in the cap, and is sized on the other end to permit rotation in the bore. An adjusting wheel is secured to the end of the shaft outside of the bore, so that upon rotation of the wheel, the shaft will rotate and will advance through the threaded hole in the cap. As the shaft advances through the threaded hole, the tubular member will slide in a direction transverse to the spindle to carry the tool to a position of engagement with the friction surface of a drum that is mounted on the spindle.

By attaching a second mechanical power-transmission assembly to the end of the adjusting shaft opposite the adjusting wheel, the carriage assembly of Billeter may be converted to a cross-feed mechanism such as may be utilized to feed a tool in a direction perpendicular to the axis of the spindle on which the workpiece is mounted, so as to permit machining of brake discs. The known embodiment of this second power-transmission assembly, like the first, is a complex mechanical device that incorporates a plurality of gears, shafts, couplings and other components. This known assembly operates to rotate the adjusting shaft with respect to the frame of the lathe to move the tool in an axial direction with respect to the adjusting shaft and in a direction perpendicular to the axis of the spindle. The adjusting shaft is thereby converted to a feed shaft (or, since it is threaded at one end, to a feed screw) for advancing a tool across the friction surface or surfaces of a brake rotor.

It can be appreciated from the foregoing discussion that the known methods and apparatus for imparting relative motion between a tool that is carried by a tool holder and a workpiece on a lathe involve complex mechanical devices, incorporating a plurality of gears, springs and other components to rotate a shaft with respect to the frame of the lathe, and thereby to move the tool with respect to the workpiece. It will be appreciated by those skilled in the art to which the invention relates that the cost of such apparatus and its maintenance requirements will generally be directly proportional to its complexity, and that its reliability will generally be inversely proportional thereto. Furthermore, the devices that utilize gears to transmit rotation to a shaft or screw that imparts motion to a tool holder are limited in the speeds at which they can operate by the number and size of the gears employed.

It would be advantageous, therefore, if a method and apparatus could be devised that would more simply and reliably operate to impart relative motion between a tool that is carried by a tool holder and a workpiece on a lathe. It would also be advantageous if such a method and apparatus could be devised that would be readily adaptable to incorporation in lathes commonly in use. Furthermore, it would be advantageous if such a method and apparatus could be devised that would be more efficient than known methods and apparatus.

OBJECTS AND ADVANTAGES OF THE INVENTION

Accordingly, it is an object of the invention claimed herein to provide a method and apparatus that may be utilized to impart relative motion between a tool that is carried by a tool holder and a workpiece on a lathe without employing a complicated mechanical power-transmission system. It is yet another object of this invention to provide such a method and apparatus that operates to move the tool with respect to the workpiece without rotating a shaft in the frame of the lathe. It is still another object of the invention to provide such a method and apparatus that is readily adaptable to lathes commonly in use. It is yet another object of this invention to provide such a method and apparatus that may be operated at a variety of speeds. It is another object of this invention to provide such a method and apparatus that incorporates a safety feature that will avoid damaging the lathe, its power-transmission system, the tool or the workpiece if the tool binds on the workpiece. Additional objects and advantages of this invention will become apparent from an examination of the drawings and the ensuing description.

SUMMARY OF THE INVENTION

The invention comprises a method and apparatus for imparting relative motion between a tool that is carried by a tool holder and a workpiece on a lathe. According to the invention, a feed screw having a first end and a second end with a threaded portion near the first end is provided. A tool holder carrying a tool is fixed with respect to the second end of the feed screw, so that axial motion of the feed screw will be transmitted to the tool carried by the tool holder. The invention also includes a hollow drive tube which is disposed to rotate about its long axis, and which has an internal diameter large enough to accommodate the feed screw. The drive tube is mounted at a location that is fixed with respect to the workpiece, and a nut that is threaded to mate with the threaded portion of the feed screw is attached to one end of the drive tube. A drive means is attached to the drive tube, and the second end of the feed screw is locked so as to inhibit rotational motion thereof. The nut is mated with the threaded portion of the feed screw, and the drive tube is rotated with the drive means so as to impart axial motion to the feed screw as the nut rotates thereabout and to impart relative motion thereby to the tool that is carried by the tool holder.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein, or to use in connection with brake lathes in general. Various changes are contemplated such as would ordinarily occur to one skilled in the art to which the invention relates.

BRIEF DESCRIPTION OF THE DRAWINGS

FIG. 4 is a perspective view of a locknut showing its attachment to the adjusting wheel of a cross-feed mechanism that operates according to the principles of the invention.

FIG. 5 is a side view of the locknut of FIG. 4.

FIG. 6 is a perspective view of an alternative embodiment of a locknut, showing its attachment to the adjusting wheel of a cross-feed mechanism that operates according to the principles of the invention.

DESCRIPTION OF THE PREFERRED EMBODIMENTS OF THE INVENTION AND COMPARISON THEREOF WITH THE PRIOR ART

Figure 1:
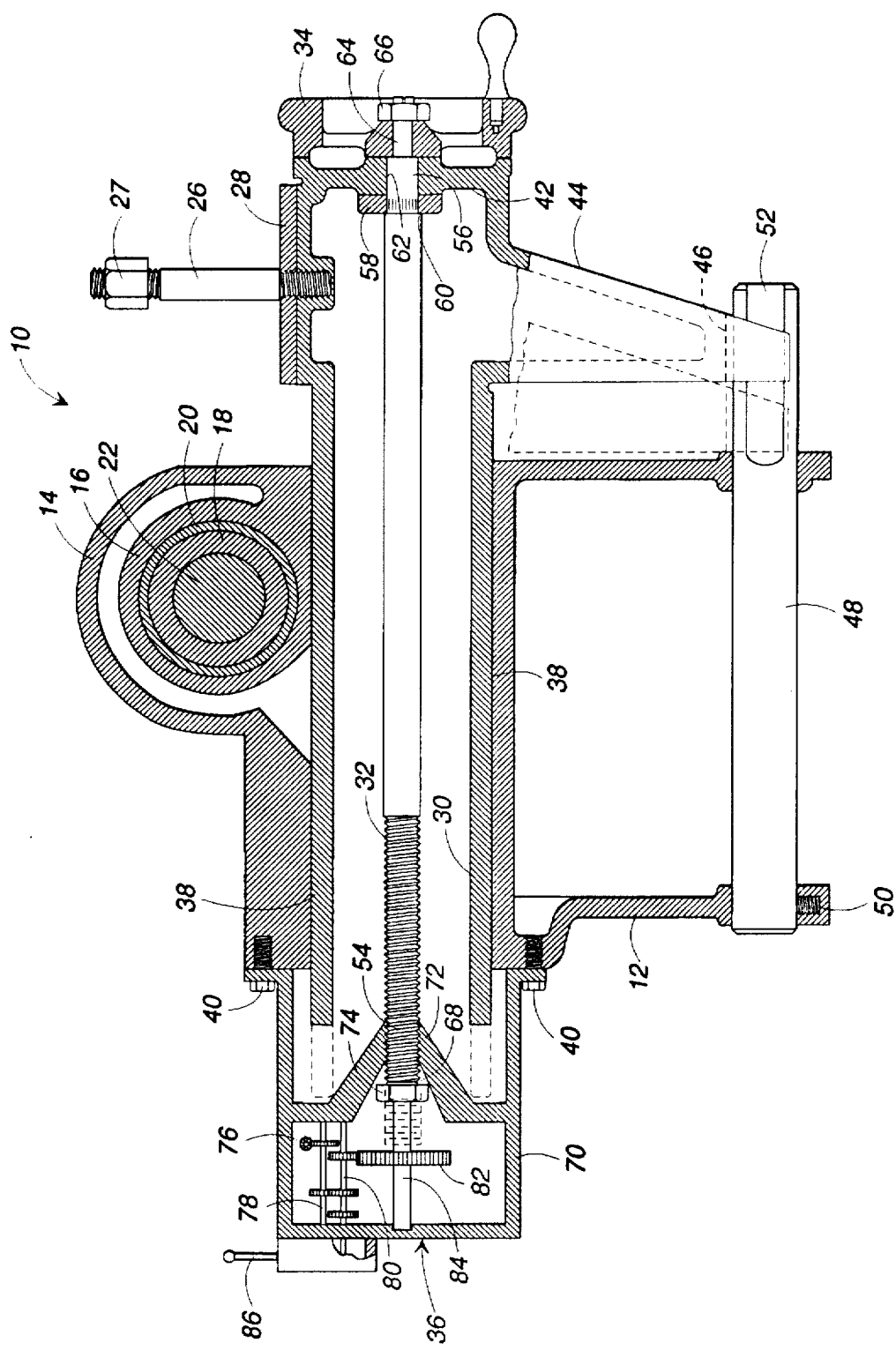
FIG. 1 is a cross-sectional view of a brake lathe that is similar to that described in U.S. Pat. No. 2,891,435 of Billeter and that is equipped with a cross-feed mechanism that is commonly in use (Prior Art).

Referring now to FIG. 1, brake lathe 10, which is similar to that described and shown in U.S. Pat. No. 2,891,435 of Billeter, is illustrated. This lathe, which is well-known and in common use, is manufactured and sold by Ammco Tools, Inc. of North Chicago, Ill. For additional information about the operation of this lathe, other than as relates to the method and apparatus for advancing a tool thereon that is discussed herein in connection with FIG. 1, reference is made to the aforementioned patent of Billeter.

As shown in FIG. 1, lathe 10 includes lower frame 12 and upper frame 14, each of which is provided in the form of a unitary casting. Upper frame 14 is contiguous with tubular portion 16, in which is mounted spindle 18, supported by bushing 20. The spindle is mounted in the frame for rotation and longitudinal or axial feed movement therein. Spindle 18 is provided with arbor 22, which is insertable through the opening of a brake drum or brake rotor in order to facilitate mounting of such workpiece thereon.

Lathe 10 is provided with mounting stud 26 and its associated nut 27, as well as tool base 28, upon which a tool assembly having a cutting or grinding tool (not shown) may be mounted in order to machine the workpiece therewith. The lathe is also provided with a cross-feed mechanism, by which the tool assembly may be advanced to machine the friction surfaces of a disc brake rotor. The cross-feed mechanism includes cross-feed support tube 30, feed screw 32, adjusting wheel 34 and transmission assembly 36.

Cross-feed support tube 30 is mounted for sliding motion (in a left-right direction as viewed in FIG. 1) in bore 38 of the frame of lathe 10. The bore is effectively closed on the left end (as viewed in FIG. 1) by transmission assembly 36, which is attached to frame members 12 and 14 by means of bolts, two of which are shown at 40, and on the right end by end wall 42 of support tube 30. Extending downwardly from the rightmost end (as viewed in FIG. 1) of support tube 30 is guide leg 44 having a notch 46 in its lower end for receiving the outer end of guide bar 48. Bar 48 is positioned in lower frame 12 and secured therein by suitable means such as set screw 50. The outer end 52 of guide bar 48 is flattened for receiving the side surfaces of notch 46 for guiding movement of leg 44 as the support tube is moved in a manner that will be explained hereinafter.

Feed screw 32, disposed within cross-feed support tube 30, is provided with threaded portion 54 at one end thereof, and with a reduced-diameter portion 56 on the other end. Collar 58 is fitted on portion 56 in abutment with shoulder 60. Portion 56 is knurled for constraining collar 58 so that the collar will rotate with the feed screw. Reduced-diameter portion 56 has bearing support in bore 62 in end wall 42 of cross-feed support tube 30. Outside of end wall 42, feed screw 32 is further reduced in diameter at portion 64 for receiving adjusting wheel 34. The end of reduced-diameter portion 64 is threaded to receive nut 66, in order to secure the adjusting wheel thereon for rotation with feed screw 32.

As shown in FIG. 1, the tool holder or carrier, comprised of stud 26, nut 27 and tool base 28, is fixed with respect to cross-feed support tube 30 and with respect to the end of the feed screw at portion 56, so that axial motion of the feed screw will be translated to the tool carried by the tool holder.

Feed screw 32 is provided, at the end of threaded portion 54, with a reduced-diameter threaded portion 68. Both portion 54 and reduced-diameter portion 68 are utilized for engagement with transmission assembly 36, the components of which are generally contained in housing 70. Feed screw nut 72 of transmission assembly 36 is threaded onto threaded portion 54 of the feed screw, and coupling nut 74 is threaded onto reduced-diameter portion 68. When the transmission assembly is operated, power from the lathe motor (not shown) is transmitted by way of worm gear 76, through the gears on shafts 78 and 80 to gear 82 on shaft 84. As shaft 84 rotates, coupling nut 74, which is affixed thereto, rotates the feed screw, causing it to move axially with respect to nut 72 through the range shown by the dashed lines representing threaded portion 54. Since assembly 36 is secured to the frame of the lathe, such axial motion of the rotating feed screw with respect to the frame will cause cross-feed support tube 30 to slide within bore 38 of the frame through the range represented by the dashed lines representing support tube 30 (and guide leg 44). As the cross-feed support tube moves through the indicated range upon actuation of the transmission assembly, a tool (not shown) carried on tool assembly mounting stud 26 will move in a radial direction relative to spindle 18 to machine a workpiece, such as a disc brake rotor (also not shown) mounted on arbor 22. Once the feed screw, support tube and tool assembly are moved, through the action of transmission assembly 36, through the indicated range as shown in FIG. 1, the transmission assembly may be disengaged, and adjusting wheel 34 may be utilized to turn the feed screw in the opposite direction to return it and the support tube and tool assembly to their original positions.

It has been found that a use of the method and apparatus illustrated in FIG. 1 for advancing a tool with respect to a rotor on spindle 18 has several disadvantages. It has been found that rotation of shaft 32 in order to advance the tool can result in wearing of the shaft at bore 62. Such wear can lead to binding of the shaft and consequent failure of the cross-feed assembly. Although this problem can be addressed by the interposition of a bushing around the shaft in the bore, such a solution is difficult and expensive to employ for lathes already in use. In addition, transmission assembly 36 is inherently inefficient, because its many cooperating components consume much of the power supplied to it without transmitting it to move the tool with respect to the workpiece. Thus, for example, the employment of the many gears of assembly 36 generates heat that only contributes to excessive wear and consequent failure of the assembly. Furthermore, because the assembly is so complex, its repair is necessarily time-consuming and its replacement is expensive. Finally, if the tool binds on the workpiece during advancing of the tool, the only means of relief is the failure or shearing of one or more of the gears in the transmission assembly. Although a shear gear may be provided for such purpose, the failure or shearing of any such gear will necessitate repair of the transmission assembly before it may be utilized again. Finally, the number of operating speeds that may be employed to advance the tool through the use of transmission assembly 36 is limited by the number and size of the gears on shafts 78, 80 and 84 that can be engaged, according to the placement of gear shifter 86, to rotate the feed screw.

Figure 2:
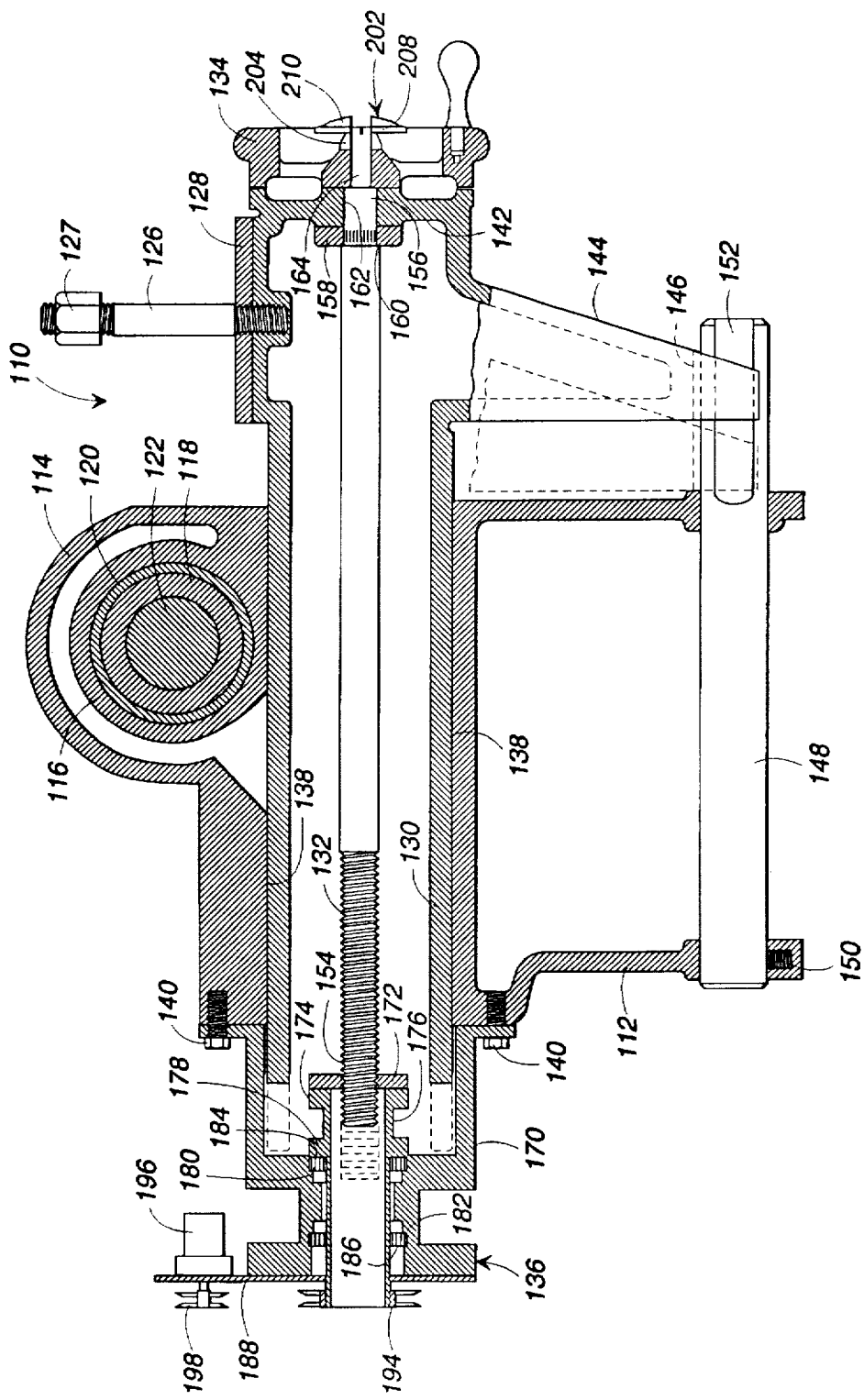
FIG. 2 is a cross-sectional view of a brake lathe that is similar to the one shown in FIG. 1, except that it is equipped with a cross-feed mechanism that operates according to the principles of the invention.

Referring now to FIG. 2, there is illustrated a method and apparatus for advancing a tool on a lathe that is simpler and more efficient than known methods and apparatus. Lathe 110 of FIG. 2 is similar to lathe 10 of FIG. 1, except that it incorporates an embodiment of the invention instead of the cross-feed mechanism of the prior art. This lathe includes lower frame 112 and upper frame 114, which are comparable to frame portions 12 and 14 of lathe 10. Upper frame 114 is contiguous with tubular portion 116, in which is mounted spindle 118, supported by bushing 120. The spindle is mounted in the frame for rotation and longitudinal or axial feed movement therein. Spindle 118 is provided with arbor 122, which is insertable through the opening of a brake drum or brake rotor in order to facilitate mounting of such workpiece thereon.

Lathe 110 is provided with mounting stud 126 and its associated nut 127, as well as tool base 128, upon which a tool assembly having a cutting or grinding tool (not shown) may be mounted in order to machine the workpiece therewith. The lathe is also provided with a cross-feed mechanism, by which the tool assembly may be advanced to machine the friction surfaces of a disc brake rotor. The cross-feed mechanism includes cross-feed support tube 130, feed screw 132, adjusting wheel 134, locknut 202 and transmission assembly 136.

Cross-feed support tube 130 is mounted for sliding motion (in a left-right direction as viewed in FIG. 2) in bore 138 of the frame of lathe 110. The bore is effectively closed on the left end (as viewed in FIG. 2) by transmission assembly 136, which is attached to frame members 112 and 114 by means of bolts, two of which are shown at 140, and on the right end by end wall 142 of support tube 130. Extending downwardly from the rightmost end (as viewed in FIG. 2) of support tube 130 is guide leg 144 having a notch 146 in its lower end for receiving the outer end of guide bar 148. Bar 148 is positioned in lower frame 112 and secured therein by suitable means such as set screw 150. The outer end 152 of guide bar 148 is flattened for receiving the side surfaces of notch 146 for guiding movement of leg 144 as the support tube is moved in a manner that will be explained hereinafter.

Feed screw 132, disposed within cross-feed support tube 130, is provided with threaded portion 154 at one end thereof, and with a reduced-diameter portion 156 on the other end. Collar 158 is fitted on portion 156 in abutment with shoulder 160. Reduced-diameter portion 156 is preferably knurled for constraining collar 158 so that the collar will rotate with the feed screw. In the alternative, portion 156 may have the same diameter as the main body of feed screw 132, and collar 158 may be attached to the feed screw by means of a pin that is inserted in a hole that extends through the collar and into (or through) the feed screw, although such alternative embodiment is not illustrated in the drawings. Portion 156 has bearing support in bore 162 in end wall 142 of cross-feed support tube 130. Preferably, a bushing (not shown) is interposed between portion 156 and bore 162. Outside of end wall 142, feed screw 132 is further reduced in diameter at portion 164 for receiving adjusting wheel 134.

As shown in FIG. 2, the tool holder or carrier, comprised of stud 126, nut 127 and tool base 128, is fixed with respect to cross-feed support tube 130 and with respect to the end of feed screw at portion 156, so that axial motion of the feed screw will be translated to the tool carrier by the tool holder.

Feed screw 132 may be provided, at the end of threaded portion 154, with a reduced-diameter threaded portion (not shown), although if it is so provided, such reduced-diameter portion does not contribute to the operation of the invention. Portion 154, however, is utilized for engagement with transmission assembly 136.

Figure 3:
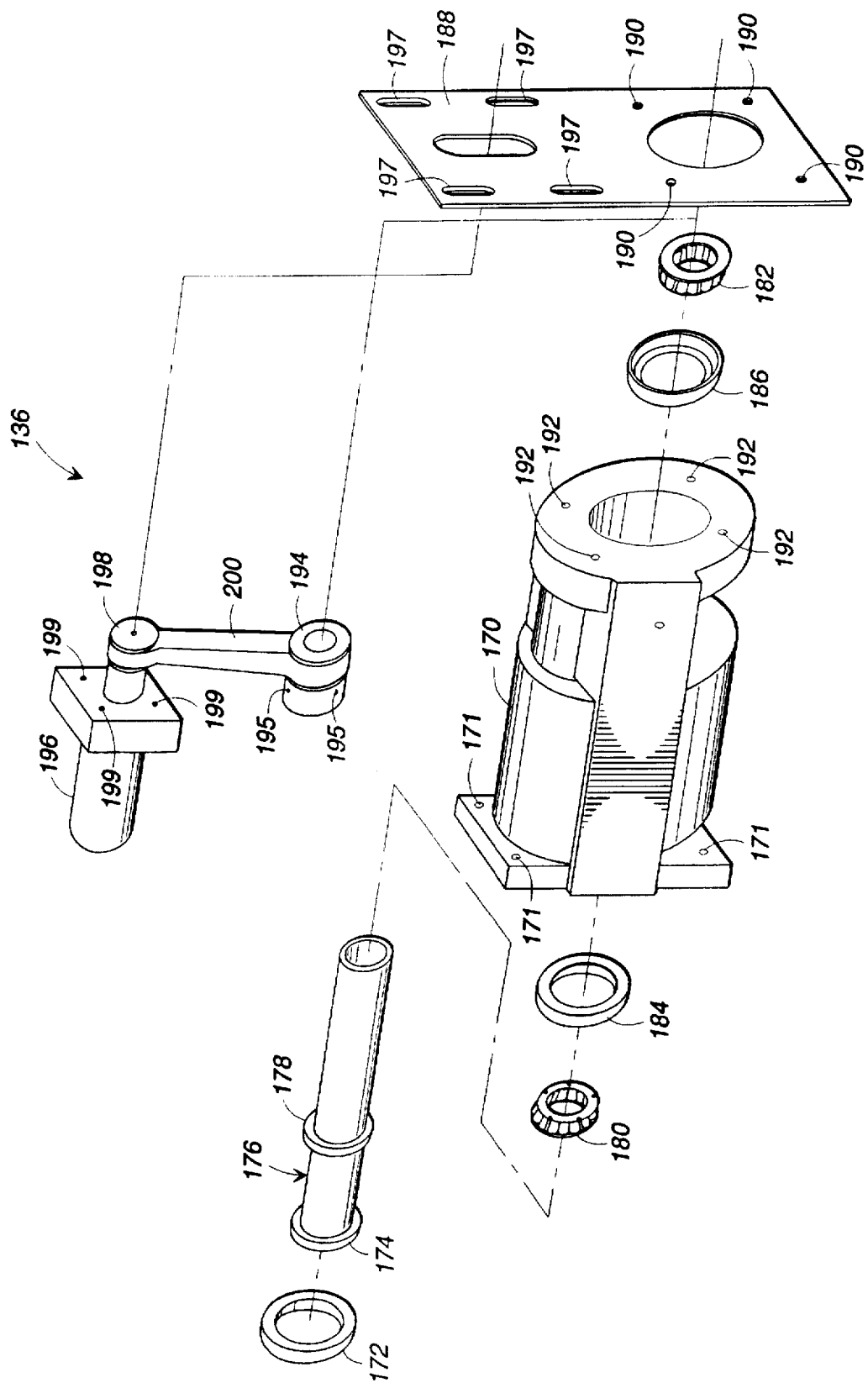
FIG. 3 is an exploded perspective view of a power-transmission assembly of a cross-feed mechanism that operates according to the principles of the invention.

Referring now to FIGS. 2 and 3 (which latter drawing illustrates transmission assembly 136), it can be seen that the components of transmission assembly 136 are generally contained in housing 170, which is a generally hollow component that is preferably comprised of cast aluminum. Housing 170 is preferably attached to the frame of lathe 110 by means of bolts 140 (two of which are illustrated in FIG. 2). To this end, bolt holes 171 are provided in housing 170 (see FIG. 3), which bolt holes may be aligned with the holes in the lathe frame to properly position the transmission assembly for operation.

Transmission assembly 136 also includes feed screw nut 172, which is affixed to integral collar 174 of hollow drive tube 176 and threaded in a mating relationship onto threaded portion 154 of the feed screw. Preferably nut 172 and feed screw 132 are provided with mating acme threads. Nut 172 may be affixed to collar 174 by any convenient means of attachment. Preferably, nut 172 is affixed to collar 174 by a pair of bolts (not shown) that are disposed in an axial direction with respect to the drive tube. Drive tube 176 is also provided with integral collar 178 that is similar in size and shape to collar 174. These collars may be welded onto drive tube 176, or attached by other suitable means. In the alternative, collars 174 and 178 may be formed by cutting down the outside diameter of a thick-walled pipe to the configuration of drive tube 176. Drive tube 176 must have an internal diameter large enough to accommodate the feed screw, and it is otherwise provided in suitable dimensions depending on the size of the machine with which it is used. Preferably, for a lathe such as is described in the Billeter patent, the drive tube is provided with an internal diameter of approximately one inch, and a wall thickness of approximately one-eighth inch. The drive tube and associated collars are preferably formed from mild steel.

Drive tube 176 is mounted in housing 170, which is attached to the frame of lathe 110 so as to fix the location of the drive tube with respect to the workpiece. Drive tube 176 is disposed to rotate about its long axis in the housing. Preferably the drive tube is mounted in the housing and journaled therein by means of a pair of tapered roller bearings, such as tapered roller bearing assemblies 180 and 182, and their associated bearing races 184 and 186. The bearings and races are mounted in suitable slots formed in housing 170, which is sized to permit rotation of the drive tube therein.

At the outside end of housing 170 (on the left side as viewed in FIG. 2, and on the right side as viewed in FIG. 3) is located motor mount 188. The motor mount may be attached to the housing by any convenient means such as by a use of bolts. To this end, motor mount 188 is preferably provided with four bolt holes 190 that are arranged to align with bolt holes 192 in the housing.

A drive means, comprising collared pulley 194, motor 196, pulley 198 and drive belt 200, is attached to the drive tube. Pulley 194 is configured for attachment over the end of drive tube 176, preferably by means of set screws (not shown) through holes 195. Preferably, pulley 194 is pushed onto the end of the drive tube in order to install it thereon, and at the same time, to set the tension of the drive tube with respect to bearings 180 and 182. It is not necessary, of course, that a collared pulley be provided in one piece. Alternatively, a separate pulley could be affixed to a collar similar to collars 174 and 178, and such collar could be attached to the end of the drive tube by any convenient means.

The drive means also includes motor 196, which may be attached to motor mount 188 by any convenient means, such as by suitable bolts disposed through slots 197 of motor mount 188 and into holes 199 in the motor. Slots 197 are provided instead of holes so that the position of the motor may be adjusted to provide the proper tension on the drive belt. The motor may be selected to be of any convenient size, depending on the size of the machine with which it is to be incorporated and the desired speed of operation. Good results have been obtained, in modifying a Billeter-type lathe, by selection of a motor providing at least 100, and preferably 150 inch-pounds of torque. The motor selected is preferably of the variable speed type, wherein a rheostat or similar device is provided to vary the speed of operation through a wide range.

The drive means of the invention is more efficient than the previously known drive means that is described herein in connection with FIG. 1, because it is simpler, and it involves no gearing components that are subject to wear and the generation of heat. Furthermore, because the assembly is so simple, its repair is easily made and its replacement is inexpensive. In addition, the drive means of the invention is independent of the drive means for the spindle, and when the drive means includes a variable speed motor, it can operate to advance the tool with respect to the workpiece within a range of speeds that will allow an operator to more readily adjust to varying conditions.

The invention also contemplates provision of a locking means for locking the end of the feed screw at the adjusting wheel, so that the feed screw will be constrained from turning as the drive means is employed to turn nut 172 therearound. Preferably, a friction lock is employed, and locknut 202 is one such locking means that may be provided, as illustrated in FIGS. 2, 4 and 5. As shown therein, locknut 202 is provided with a threaded portion 204 for engagement with threaded end 206 of reduced diameter portion 164 of feed screw 132. Nut 202 is also provided with ring 208 and wing portions 210, which permit easy manipulation of the locknut as it is hand tightened onto threaded portion 206. As the locknut is advanced onto threaded end portion 206 and fastened down thereon, portion 204 bears against the outer end of adjusting wheel 134 so that the adjusting wheel is locked against end wall 142 of cross-feed support tube 130 so as to inhibit rotation of the feed screw.

It may be desirable to provide an extension for threaded end 206 of feed screw 132. An alternative embodiment of a locknut that incorporates such an extension is illustrated in FIG. 6. As shown therein, locknut 302, similar to locknut 204 of FIGS. 2, 4 and 5, may be employed in conjunction with extension 312 and set screw 318. Extension 312 is provided with an internally threaded portion 314 that is adapted to mate, in threaded engagement, with threaded end 206 of feed screw 132. Extension 312 is also provided with an externally threaded portion 316 that is adapted to mate, in threaded engagement, with threaded portion 304 of locknut 302. Set screw 318 is provided with an externally threaded portion 320 that is adapted to mate, in threaded engagement, with internally threaded portion 314 of extension 312.

In use, extension 312 is threaded onto end 206 of feed screw 132, and set screw 318 is threaded into the extension. A tool such as a hex driver may be utilized to engage with end 322 of set screw 318 so as to thread the set screw onto the extension until it contacts end 206 of the feed screw. Then locknut 302 may be threaded over the extension. Nut 302 is also provided with ring 308 and wing portions 310, which permit easy manipulation of the locknut as it is hand tightened onto extension 312. As the locknut is advanced onto extension 312 and fastened down thereon, portion 304 (in cooperation with extension 312) bears against the outer end of adjusting wheel 134 so that the adjusting wheel is locked against end wall 142 of cross-feed support tube 130 so as to inhibit rotation of the feed screw.

Once the feed screw is locked so that its rotational motion is inhibited, the drive means may be actuated to rotate the drive tube. As drive tube 176 is rotated, nut 172 rotates around feed screw 132, causing it to move axially into or out of the drive tube (depending on the direction the tool is to be moved) with respect to nut 172 through the range shown by the dashed lines representing threaded portion 154. Since assembly 136 is secured to the frame of the lathe, such axial motion of the non-rotating feed screw with respect to the frame will cause cross-feed support tube 130 to slide within bore 138 of the frame through the range represented by the dashed lines representing support tube 130 (and guide leg 144). As the cross-feed support tube moves through the indicated range upon actuation of the transmission assembly, a tool (not shown) carried on tool assembly mounting stud 126 will move in a radial direction relative to spindle 118 to machine a workpiece, such as a disc brake rotor (also not shown) mounted on arbor 122. Once the feed screw, support tube and tool assembly are moved, through the action of transmission assembly 136, through the indicated range as shown in FIG. 2, the motor may be disengaged, locknut 202 (or 302) may be loosened and adjusting wheel 134 may be utilized to turn the feed screw in the opposite direction to return it and the support tube and tool assembly to their original positions. It should be evident that the invention provides for only half of the rotation of the feed screw (when the feed screw is returned to its starting position), as compared with the known cross-feed method and apparatus. This reduction in rotation of the feed screw will reduce the wear thereon, especially at bore 162.

This embodiment of the invention incorporates a safety feature to prevent damage to the cross-feed mechanism, the tool or the workpiece in the event that the tool binds or drags during working of the workpiece. In such event, the hand-tightened locknut will be unable to continue to prevent the feed screw from rotating. The friction lock between the locknut, the adjusting wheel and the end wall of the cross-feed support tube will release or be overcome, and feed screw 132 and adjusting wheel 134 will rotate. Since feed screw nut 172 will also be rotating (due to action of the drive means), the feed screw will stop its axial motion, and this will stop the advance of the tool with respect to the workpiece.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, may be applied to any feed mechanism for advancing a tool with respect to a workpiece on a lathe. The invention is susceptible to various modifications and adaptations, and the same are intended to be comprehended within the meaning and range of equivalents of the appended claims.

What is claimed is:

1. A method for imparting relative motion between a tool that is carried by a tool holder and a workpiece on a lathe, which method comprises:
    a) providing a feed screw having a first end and a second end and having a threaded portion near the first end thereof;
    b) fixing the tool holder with respect to the feed screw, so that axial motion of the feed screw will be translated to the tool carried by the tool holder;
    c) providing a hollow drive tube that is disposed to rotate about its long axis, which drive tube has an internal diameter large enough to accommodate the feed screw;
    d) mounting the drive tube at a location that is fixed with respect to the workpiece;
    e) attaching a nut that is threaded to mate with the threaded portion of the feed screw to one end of the drive tube;
    f) attaching a drive means to the drive tube;
    g) locking the second end of the feed screw so as to temporarily prohibit rotational motion of the feed screw;
    h) mating the nut with the threaded portion of the feed screw so that at least a portion of the feed screw extends into the drive tube;
    i) rotating the drive tube with the drive means so as to impart axial motion to the feed screw as the nut rotates thereabout and to impart relative motion thereby to the tool that is carried by the tool holder.

2. The method of claim 1, wherein the threaded portion of the feed screw and the nut are provided with acme threads.

3. The method of claim 1, wherein the drive means includes a variable speed motor.

4. The method of claim 1, wherein the drive tube has a first end and a second end, and wherein the nut that is threaded to mate with the threaded portion of the feed screw is attached to the first end of the drive tube, and wherein the drive tube is mounted in a housing and journaled therein by means of a pair of tapered roller bearings.

5. The method of claim 4, wherein the drive means includes a pulley that is mounted onto the second end of the drive tube.

6. The method of claim 5, wherein the pulley is pushed onto the second end of the drive tube in order to set the tension of the drive tube with respect to the bearings.

7. The method of claim 1, wherein the second end of the feed screw is locked to temporarily prohibit rotation thereof by a friction lock.

8. The method of claim 7, wherein the friction lock is adapted to release so as to permit rotational motion of the feed screw if the tool binds on the workpiece, thereby to preclude axial motion of the feed screw with respect to the nut.

9. In a process for working a workpiece on a lathe to produce a smooth surface thereon, wherein a feed screw, which is adapted for motion with respect to the workpiece, is utilized to move a cutting tool carried by a tool carrier across the surface of the workpiece, and wherein the feed screw has a first end and a second end and a threaded portion near the first end thereof and a tool carrier that is fixed with respect to the second end thereof, the improvement which comprises:
    a) providing a hollow drive tube that is disposed to rotate about its long axis, which drive tube has an internal diameter large enough to accommodate the feed screw;
    b) mounting the drive tube at a location that is fixed with respect to the workpiece;
    c) attaching a nut that is threaded to mate with the threaded portion of the feed screw to one end of the drive tube;
    d) attaching a drive means to the drive tube;
    e) locking the second end of the feed screw so as to temporarily prohibit rotational motion thereof;
    f) mating the nut with the threaded portion of the feed screw so that at least a portion of the first end thereof extends into the drive tube;
    g) rotating the drive tube with the drive means so as to impart axial motion to the feed screw as the nut rotates thereabout and to impart relative motion thereby to the tool that is carried by the tool holder.

10. The improved process of claim 9, wherein the threaded portion of the feed screw and the nut are provided with acme threads.

11. The improved process of claim 9, wherein the drive means includes a variable speed motor.

12. The improved process of claim 9, wherein the drive tube has a first end and a second end, and wherein the nut that is threaded to mate with the threaded portion of the feed screw is attached to the first end of the drive tube, and wherein the drive tube is mounted in a housing and journaled therein by means of a pair of tapered roller bearings.

13. The improved process of claim 12, wherein the drive means includes a pulley that is mounted onto the second end of the drive tube.

14. The improved process of claim 13, wherein the pulley is pushed onto the second end of the drive tube in order to set the tension of the drive tube with respect to the bearings.

15. The improved process of claim 9, wherein the second end of the feed screw is locked to preclude rotational motion thereof by a friction lock.

16. The improved process of claim 15, wherein the friction lock is adapted to release if the tool binds on the workpiece, so as to permit rotational motion of the feed screw and thereby preclude axial motion of the feed screw with respect to the nut.

17. An improved cross-feed mechanism for a lathe, which mechanism includes a feed screw having a first end and a second end and having a threaded portion near the first end thereof and a tool carrier that is fixed with respect to the second end thereof and an adjusting wheel at the second end thereof, which feed screw is adapted for motion with respect to a workpiece that is to be worked on the lathe by a tool carried by the tool carrier, wherein the improvement comprises:
    a) a hollow drive tube that is disposed to rotate about its long axis, which drive tube has an internal diameter large enough to accommodate the feed screw, and which drive tube is mounted at a location that is fixed with respect to the workpiece;
    b) a nut that is threaded to mate with the threaded portion of the feed screw and which is attached to one end of the drive tube, and wherein at least a portion of the feed screw extends into the drive tube;
    c) a drive means that is attached to the drive tube;
    d) locking means at the second end of the feed screw for locking the feed screw to temporarily prohibit rotational motion thereof;
    whereby the second end of the feed screw may be locked so as to temporarily prohibit rotational motion thereof, and whereby the nut may be mated with the threaded portion of the feed screw, and whereby the drive tube may be rotated with the drive means so as to impart axial motion to the feed screw as the nut rotates thereabout and to impart relative motion thereby to the tool that is carried by the tool holder.

18. The improved cross-feed mechanism of claim 17, wherein the threaded portion of the feed screw and nut are provided with acme threads.

19. The improved cross-feed mechanism of claim 17, wherein the drive means includes a variable speed motor.

20. The improved cross-feed mechanism of claim 17, wherein the drive tube has a first end and a second end, and wherein the nut that is threaded to mate with the threaded portion of the feed screw is attached to the first end of the drive tube, and wherein the drive tube is mounted in a housing and journaled therein by means of a pair of tapered roller bearings.

21. The improved cross-feed mechanism of claim 20, wherein the drive means includes a pulley that is mounted onto the second end of the drive tube.

22. The improved cross-feed mechanism of claim 21, wherein the pulley is pushed onto the second end of the drive tube in order to set the tension of the drive tube with respect to the bearings.

23. The improved cross-feed mechanism of claim 17, wherein a friction lock is utilized to lock with the adjusting wheel on the second end of the feed screw so as to temporarily prohibit rotational motion of the feed screw.

24. The improved cross-feed mechanism of claim 23, wherein the friction lock is adapted to release so as to permit rotational motion of the feed screw if the tool binds on the workpiece, so that axial motion of the feed screw with respect to the nut will be precluded.

* * * * *